Jan. 17, 1939.	W. F. BOETTGER	2,143,838
APPARATUS FOR WASHING FRUIT
Filed Jan. 10, 1938	3 Sheets-Sheet 2
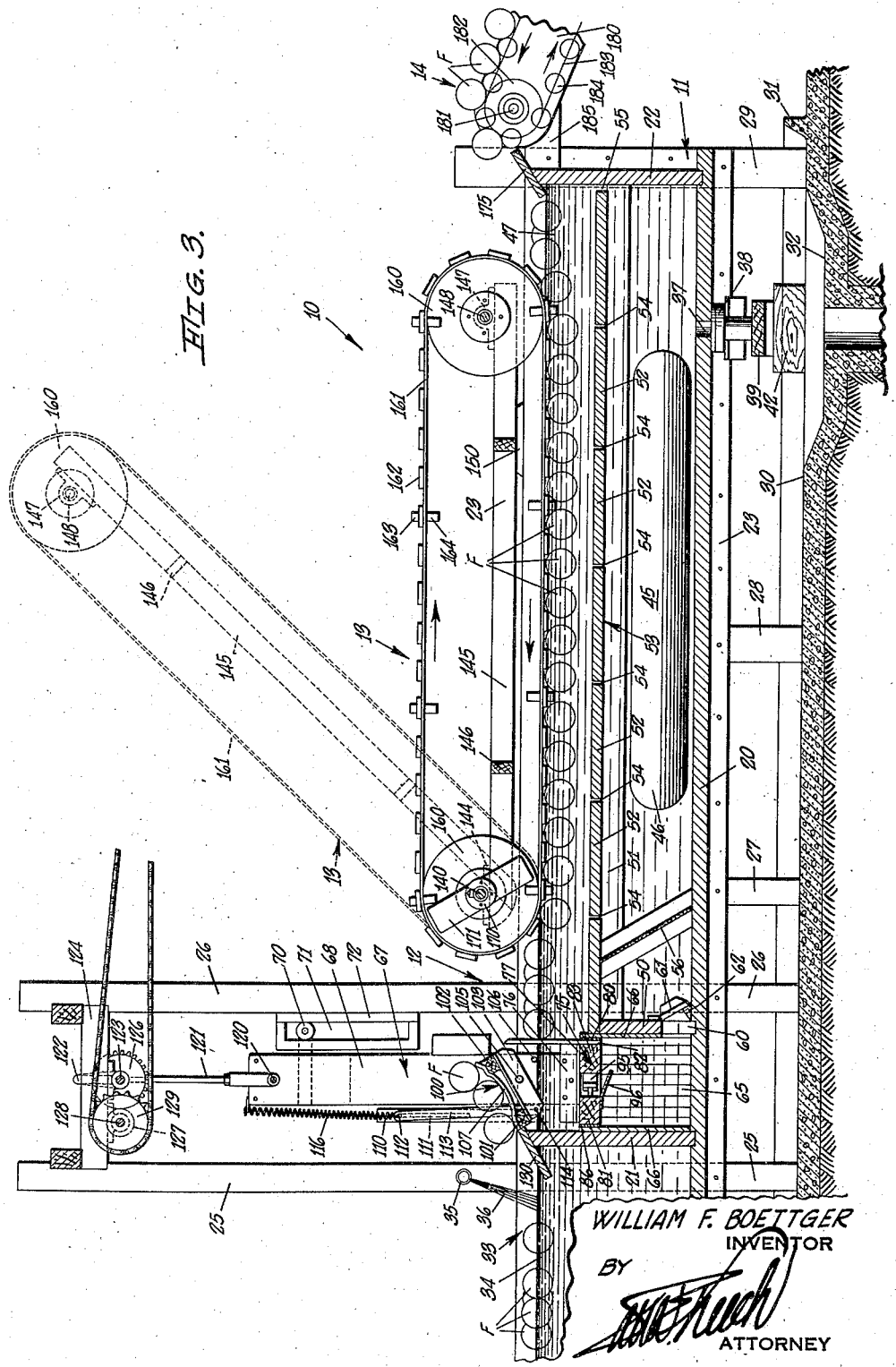
WILLIAM F. BOETTGER
INVENTOR
BY
ATTORNEY

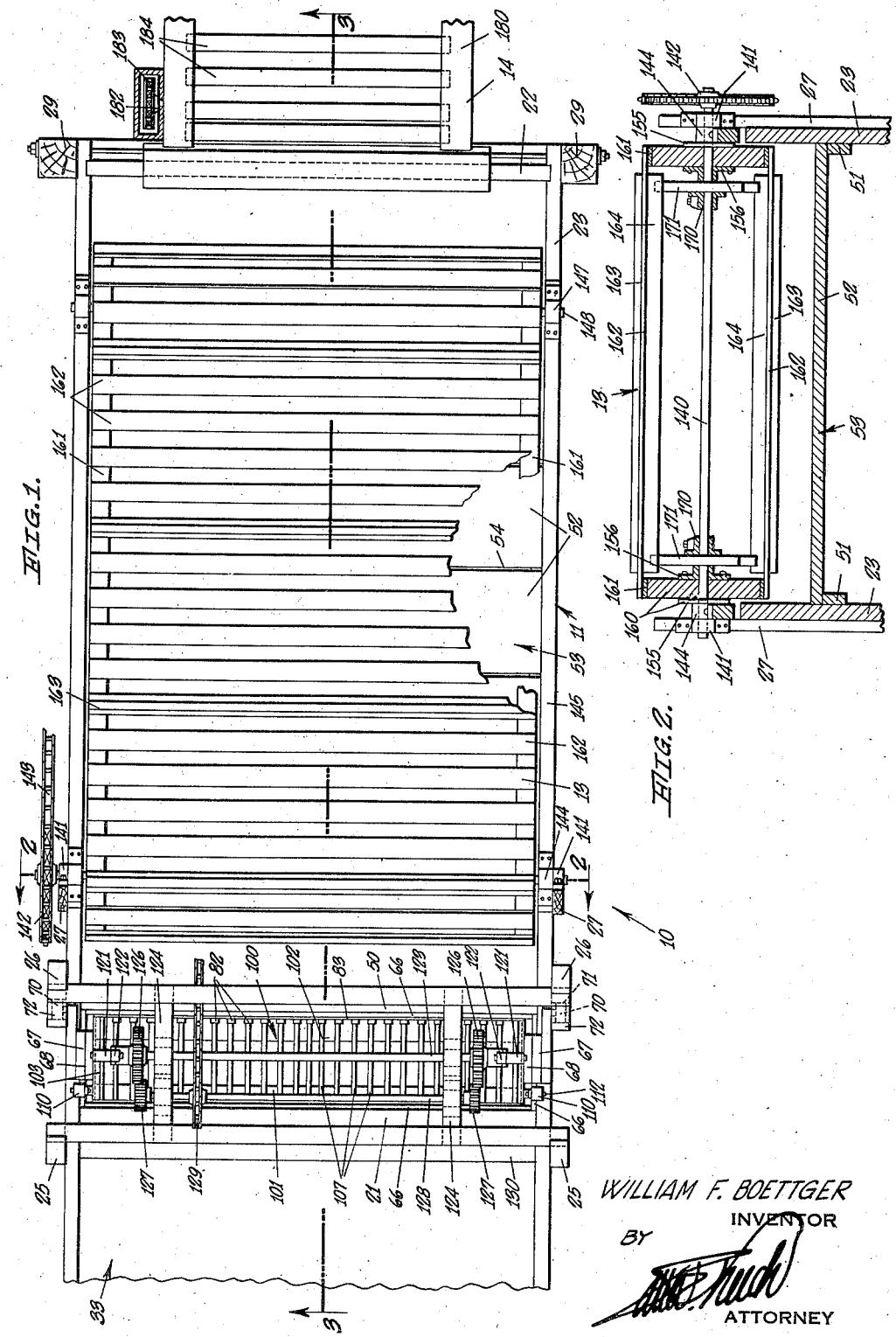

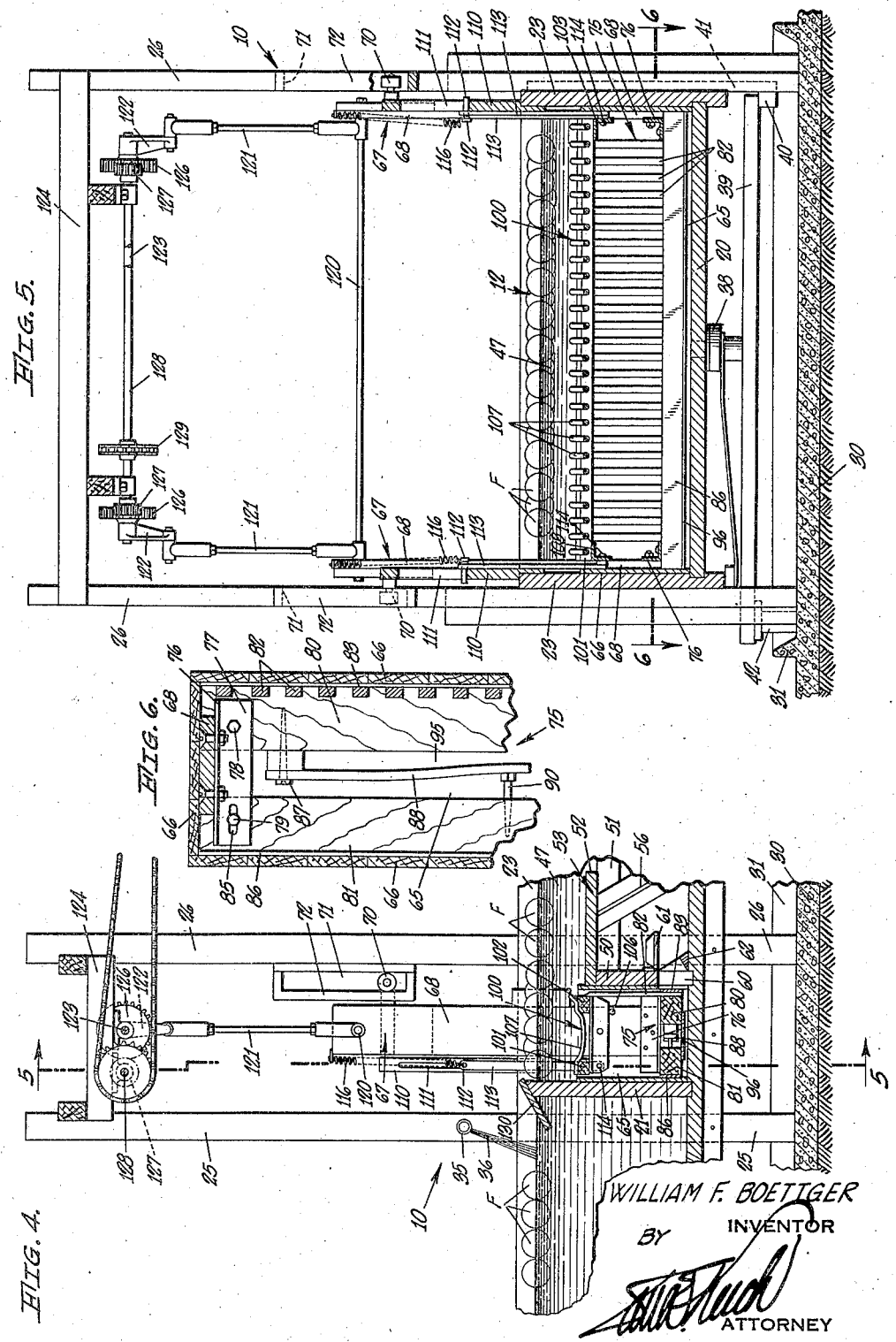

Patented Jan. 17, 1939

2,143,838

UNITED STATES PATENT OFFICE 2,143,838

APPARATUS FOR WASHING FRUIT

William F. Boettger, Redlands, Calif.

Application January 10, 1938, Serial No. 184,263

2 Claims. (Cl. 146—194)

This invention relates to the art of preparing fresh fruit for the market and has particular utility in washing said fruit.

The fruit washer art includes a wide variety of species, each of which is directed to the solution of problems peculiar to the handling of a particular kind of fruit. The washing of apples for instance is complicated by the problem of having to remove arsenic spray residue from the fruit so as to meet the low tolerances prescribed by the various governments under which the fruit is packed and shipped. The arsenic spray seems to be the only way yet found by which the farmers can kill those moths, the larva of which are the worms commonly found in apples, and as the spray is poisonous it must be almost entirely removed from the apples to prevent poisoning of the people eating these. A weak solution of muriatic acid has been accepted as the best available solvent of this poison, and the art of apple washers has been largely concerned with the problems of using this acid for removing the arsenic from apples without damaging the washer or the fruit. One of the main difficulties met with in washing apples with muriatic acid is the tendency of the acid to attack most materials ordinarily used in building washers. Another difficulty has been the application of the acid in a manner to secure the necessary cleaning action and yet do this with sufficient gentleness so as not to injure the fruit.

It is an object of my invention to provide a method of and apparatus for washing fresh whole fruit which will be applicable to the washing of poisonous residue from apples.

A common step in the treating of fruit incidental to preparing the same for packing is to submerge the fruit in a bath of treating liquid. This is commonly done in a tank equipped with a submerging draper. In operating these drapers an accumulation of debris in the treating solution occurs which requires frequent draining of the tank for the removal of the debris. As the draper practically covers the top of this tank the cleaning operation is a very difficult one.

It is another object of my invention to provide a tank for holding a treating solution for treating fresh whole fruit and a draper for submerging fruit in said solution which draper may with relatively small labor be disposed to give access to the tank so as to facilitate the tank being cleaned.

The manner of accomplishing the foregoing objects as well as further objects and advantages will be made apparent in the following description taken in connection with the accompanying drawings in which—

Fig. 1 is a plan view of a preferred embodiment of my invention.

Fig. 2 is a cross sectional view taken on the line 2—2 of Fig. 1, and illustrating the drive mechanism of the draper of my invention.

Fig. 3 is a longitudinal sectional view taken on the line 3—3 of Fig. 2, illustrating the fruit elevator and plunger of my invention in upward position.

Fig. 4 is a fragmentary view similar to Fig. 3, illustrating the fruit elevator and pump plunger of my invention in downward position.

Fig. 5 is a transverse sectional view of the fruit elevator and pump plunger reciprocating mechanism of my invention and is taken on line 5—5 of Fig. 4.

Fig. 6 is an enlarged fragmentary view taken on the line 6—6 of Fig. 5 and illustrating the details of construction of the plunger of my invention.

Referring specifically to the drawings, these illustrate a fruit washer 10 comprising a preferred embodiment of my invention. This washer includes a solution tank 11, a fruit discharge elevator-pump 12, fruit submerging draper 13, and a fruit feed conveyor 14.

The tank 11 is preferably made of redwood to resist the action of acid solution contained therein and includes a bottom 20, ends 21 and 22, and side walls 23 which are rabbeted together. Provided on the side walls 23 are a number of legs 25, 26, 27, 28 and 29, which rest upon a concrete drain floor 30 so as to support the tank 11. The drain floor 30 has a low wall 31 which surrounds the washer 10 and a drain sump 32 which discharges into a sewer.

If desired the floor 20 and the side walls 23 may be continued past the end wall 21 so as to provide a rinse tank 33 in which a body of rinse water 34 may be placed for rinsing fruit washed in the washer 10. A spray manifold 35 is mounted across the receiving end of the rinse tank 33 so as to throw a spray 36 into the rinse water 34. The bottom 20 of the tank 11 is provided with a drain hole 37 which is adapted to be closed by a gasketed plug 38 held upwardly against the bottom 20 by a pry bar 39. This bar is supported at one end on a block 40 fixed on a board 41 secured upon the outer face of one of the side walls 23 (see Fig. 5), and at the other end by a block 42 slipped under the pry bar 39.

Mounted in the tank 11 just above the floor 20 is a solution heater 45 which includes a large U-shaped tube 46, the opposite ends of which pass through and form a sealed connection with one of the walls 23. A fuel burner (not shown) is provided, the combustion gases of which are discharged through the pipe 46 for heating a body of fruit treating solution 47 contained in the tank 11.

Installed within the tank 11 is a cross wall 50 from the upper end of which, diaphragm supporting moldings 51, which are secured to the inner faces of tank side walls 23, extend to the wall 22. Supported at their opposite ends on the moldings 51 are a series of boards 52 comprising a jet forming diaphragm 53, the boards 52 being spaced in any suitable manner, as by spacer buttons secured to edges thereof, to provide jet forming slots 54 and 55. The slot 55 is larger than the slots 54 and is located adjacent the wall 22 at the fruit receiving end of the machine. Extending between one of the boards 52 and the bottom 20 of the tank adjacent to the wall 50 is a screen 56.

*The elevator-pump 12*

The wall 50 is provided with a discharge port 60 which extends substantially the entire distance along this lower edge, and is adapted to be closed by a discharge valve 61 hinged from the wall 50 and resting in its lowermost position on a valve seat 62 which is built around the port 60.

The tank walls 21, 23 and 50 unite to enclose a pump chamber 65 which is preferably lined with thin hardwood strips 66 applied to these walls. The chamber 65 extends clear across the tank 11 as shown in Fig. 5, the lining 66 having a suitable opening coextensive with the exhaust port 60.

The elevator-pump 12 has a vertical reciprocating carriage assembly 67 including a pair of uprights 68 which lie just within the lining 66 applied to inner faces of the walls 23 (see Figs. 1, 5 and 6). The uprights 68 are equipped with rollers 70 which travel in slots 71 of guide frames 72 provided on the posts 26 (see Figs. 3, 4 and 5).

Mounted on and supported by the lower ends of the uprights 68 is a pump plunger 75 (see Figs. 3, 4, 5 and 6), which includes a pair of metallic angle pieces 76, the latter being bolted to lower ends of the uprights 68 as shown in Fig. 6. When thus secured in place the angle pieces 76 have horizontal portions 77, the lower faces of which are in the same horizontal plane with the extreme lower planes of the uprights 68.

Lying just beneath the plane last mentioned and secured to the horizontal portions 77 of the angle pieces 76 by bolts 78 and 79 are wooden bars 80 and 81, which are coextensive in length with the chamber 65. The bolts 78 pass through neat holes in the angle pieces 76 to secure the bar 80 to the latter in a fixed position. The bar 80 is recessed, along the edge thereof which lies adjacent to the wall 50, to receive wooden pickets 82 which are rigidly secured in place on this bar. This same edge of the bar 80 is then faced by a metallic plate 83 which extends the entire length of the bar.

The bolts 79 extend through slots 85 in the angle pieces, so as to be slidable horizontally forward and away from the bar 80. The bar 81 is faced throughout its length by a metal strip 86 along the edge thereof which lies adjacent the wall 21.

Rigidly secured by a screw 87 at one end thereof to an inner face of the bar 80 so as to lie between the latter and the bar 81 is a wooden spring bar 88. The opposite end of the spring bar 88 is held under stress by a wood screw 90 so as to constantly exert a yieldable force which maintains the bars 80 and 81 separated and with their metal facings 83 and 86 held pressed against the hardwood lining 66 of the pump chamber 65. If desired, two of the springs 88 may be provided at opposite ends of the plunger 75 for holding the bars 80 and 81 in expanded relation.

The open space between the bars 80 and 81 forms a traveling valve passageway 95 for the plunger 75. Secured at one edge to the bottom face of the bar 81 and controlling the passageway 95 is a traveling valve flap 96 as shown in Figs. 3, 4 and 5. This flap may be formed of rubber, heavy belting or any other suitable flexible material and extends throughout the length of plunger 75.

The elevator-pump 12 also has an elevator tray 100 (see Figs. 1, 3, 4 and 5) which includes beams 101 and 102 which are rigidly secured at their opposite ends to metallic angle pieces 103, the latter being pivotally supported between the uprights 68 by pins 105. When angle pieces 103 are in their normal horizontal position of rest, as shown in Fig. 4, they engage pins 106 provided in said uprights. The beams 101 and 102 have affixed thereto a series of spaced yieldable straps 107 which are adapted for lifting and supporting fruit as will be pointed out hereinafter.

Mounted on side walls 23 (see Figs. 1, 3, 4 and 5) and extending upwardly therefrom close to and parallel with the uprights 68 are slide standards 110, having slots 111 which are adapted to slidably receive pins 112, provided on the upper ends of links 113, the lower ends of which are pivotally connected by pins 114 to eccentric portions of the angle pieces 103. Fastened at their lower ends to the pins 112 and at their upper ends to the tops of the uprights 68 are contractile springs 116 which normally maintain the elevator tray 100 in its horizontal position on the upright 68 as shown in Fig. 4.

The upper ends of the uprights 68 are connected by a bar 120, which serves as a wrist pin for pitmen 121, the upper ends of which are pivotally supported on cranks 122 provided on opposite ends of a shaft 123, the latter being journalled in suitable bearings provided on a superstructure 124 which is supported on posts 25 and 26. The shaft 123 has a master gear 126 which meshes with a drive pinion 127 on a shaft 128 which is also journalled in the upper structure 124 and is adapted to be rotated by a drive sprocket 129 fixed upon said shaft.

The rotation of the shaft 123 causes the reciprocation of the assembly carrier 67, carrying the plunger 75 and the elevator tray 100, between its lowermost position shown in Fig. 4, and its uppermost position shown in Fig. 3. In the latter of said positions it is seen that the pins 112 engage the upper limits of the slots 111 thus halting the upward movements of the links 113 and rocking the tray 100. When the tray 100 is thus tilted its lower edge is next to and in alignment with the upper surface of a fruit drop board 130 which is mounted on the upper edge of and is coextensive with the wall 21.

*Fruit submerging draper 13*

Referring particularly to Figs. 1, 2 and 3 it is to be noted that a drive shaft 140 is journalled in bearings 141 provided on upper ends of post 27. This drive shaft has a drive sprocket 142 by which it is rotated preferably at a relatively slow rate by a chain 143. Shaft 140 is surrounded by bearings 144 which lie just within the bearings 141 and directly over the tank side walls 23. Secured at their forward ends to the bearings 144 are independent frame members 145 which are rigidly spaced by cross members 146 and support, at their rear ends, bearings 147 in which is journalled an idle shaft 148. When in lowered position the frame members 145 are supported by blocks 150 provided upon the upper edges of the tank walls 23. Provided on the shafts 140 and 148 are washers 155, which lie just inside the bearings 144 and 147, and hubbed flanges 156 which are spaced inwardly from the washers 155. Disposed between the washers 155 and flanges 156 and freely rotatable about the shafts 140 and 148 are solid wood pulleys 160.

Trained about pulleys 160 are flexible rubber belts 161 carrying at spaced intervals along the outer surfaces thereof draper slats 162. Certain of these slats are provided with fruit propelling blades 163 and with impulsion receiving blades 164, the former extending outwardly and the latter inwardly from the slats on which they are mounted (see Figs. 2 and 3). Fixed on the shaft 140 are flanges 170 carrying impellers 171, the opposite ends of which are adapted to engage the impulsion receiving blades 164 as shaft 140 rotates thereby transmitting motion to the draper 13 in the direction of the arrows adjacent thereto in Fig. 3.

Feed conveyor 14

This conveyor is positioned to discharge fruit F onto a sloping drop board 175 which is mounted upon the upper edge of the tank wall 22. The conveyor 14 includes side boards 180 having suitable bearings in which a drive shaft 181 is journalled and to which are rigidly fixed sprockets 182 carrying endless chains 183 on which are mounted fruit supporting rollers 184. The side boards 180 are adapted to be supported by wood brackets 185 attached to the tank end 22. Suitable power means (not shown) is provided for rotating the shaft 181. Fruit is then manually fed onto the lower end of the conveyor 14 so as to cause a stream of fruit of constant value to be fed over the drop board 175 and into the fruit treating solution.

Operation

While the apparatus embodied in my fruit washer 10 is suitable for many different uses in the treatment of fruit it is particularly adapted for the washing of apples from which it is necessary to remove poison spray residue. The operation of this apparatus will, therefore, now be described.

The tank 22 is first filled with treating solution 47 up to the level shown in Fig. 3, this solution preferably comprising a dilute solution of muriatic acid. When the apparatus 10 is built for use with such an acid solution all of the metal parts which are exposed to the treating solution 47 are preferably of a rust resisting alloy such as "Monel" metal.

A fire is then provided in the heater 45 to maintain the acid solution 47 at a suitable temperature, this being preferably somewhere between 90° to 120° F. After the tank 33 has been filled with rinse water 34 to the level shown, fresh rinse water is supplied under pressure to the pipe 35 so that this is discharged in the form of a spray 36 as shown in Fig. 3.

Suitable power means is now applied to cause the normal operation of the fruit discharge elevator-pump 12, fruit draper 13 and fruit feed conveyor 14. A stream of fruit F is thus fed into the acid solution 47 and is caught by the draper 13, submerged thereby, and conveyed while thus submerged in the solution 47 to the discharge end of the draper where the fruit is released and permitted to float to the surface of the solution adjacent the fruit discharge elevator-pump 12.

The vertical reciprocation of the plunger 75 has the following results. On the up stroke of the plunger the acid solution 47 disposed above this passes downwardly through the valve opening 95 of the plunger into the pump chamber 65. This is facilitated by the automatic closing of the pump discharge valve 61 and the automatic opening of the traveling valve 96 located on the plunger.

On the down stroke of the plunger 75 the acid solution within the chamber 65 of the pump passes through the port 60, opens the discharge valve 61 and flows into the lower portion of the tank 11 beneath the diaphragm 53. A hydrostatic equilibrium is maintained by the discharge of an equivalent amount of acid solution upwardly through the jet openings 54 and 55 causing linear jets of acid solution to be projected through the solution against the fruit F being conveyed horizontally in submerged condition beneath the draper 13. The force of these jets is designed to be just sufficient to enter the stem and blossom ends of the fruit subjected thereto, so as to wash away the poison residue adhering to the surface of the fruit in these cavities. The fact that these jets must pass through the solution itself before impinging upon the surface of the fruit avoids the danger of injuring the fruit by the damping effect on the jets thus produced.

While the jet opening 55 might be of the same size as the jet openings 54, it is preferably slightly larger so that such a portion of the acid solution beneath the diaphragm 53 will pass through the opening 55 as is adequate to carry the fruit discharged over the drop board 75 into a position beneath the right hand end of the draper 13 so that this fruit will be caught by the slats 162 and members 163 and drawn into submerged position beneath the draper.

The reciprocation of the plunger 75 as above described is incidental to that of the carriage 67 on which the plunger is mounted. As this carriage moves downward the tray 100 carried thereby is lowered in horizontal position. At the same time the pumping action of the plunger 75 withdraws acid solution from the tank above this plunger causing a rapid flow of the solution in the direction of the tray 100 as the latter is submerged as shown in Fig. 4. This flow of solution carries with it a considerable quantity of the fruit F so that this fruit comes to overly the tray 100 as shown in this figure. With the upward movement of the carriage 67, the valve 96 of the plunger 75 opens so that there is no return flow of the fluid which has brought the fruit over the tray. As the tray is foraminous in character it rises readily through the solution and picks up the fruit floating thereabove. As the carriage 67 approaches the end of its upward stroke the pins 112 engage the tops of the slots 111 in the standards 110, thus causing the tray 100 to rock into the position in which it is shown in Fig. 3. This inclination effects the discharge by gravity of the fruit carried on the tray over the drop board and into the rinse water 34. As the fruit enters this water the spray 36 thoroughly rinses the fruit and impells it away from the drop board 130. This assures that the next load of fruit will strike the rinse water and not fruit previously delivered thereto. A source of damage to the fruit is thus eliminated.

While I have shown only a single embodiment of the apparatus of my invention it is to be understood that various changes may be made in this as well as in the manner of carrying out the method of my invention without departing from the spirit of the invention or the scope of the appended claims.

What I claim is:

1. In a fruit washer, the combination of: a tank for holding a body of fruit adapted to have fresh whole fruit submerged therein; a substantially horizontal diaphragm submerged in said tank so as to substantially separate those portions of said solution above and below said diaphragm, there being jet aperture means in said diaphragm; pump means at one end of said tank and including a vertical pump barrel, a plunger vertically reciprocal therein, and power carriage means for carrying and vertically reciprocating said plunger in said barrel, an elevator tray mounted on said plunger carriage means and reciprocated vertically therewith between positions beneath the level of said solution and above the level of said solution; and means for tilting said tray when in elevated position to discharge fruit therefrom by gravity, said pump discharging solution into the space beneath said diaphragm to produce a multiplicity of jets of solution directed against fruit floating in said solution above said diaphragm.

2. A combination as in claim 1 in which a travelling endless-belt draper is provided to submerge said fruit in said solution and cause said fruit to travel through said solution across the paths of said jets so that the fruit is successively subjected to said jets in travelling through said solution.

WILLIAM F. BOETTGER.